United States Patent [19]

Habib

[11] 4,346,912
[45] Aug. 31, 1982

[54] BASKET FOR STROLLER

[76] Inventor: Linda Habib, 345 E. 73rd St., New York, N.Y. 10021

[21] Appl. No.: 29,438

[22] Filed: Apr. 12, 1979

[51] Int. Cl.³ .............................................. B62B 7/08
[52] U.S. Cl. ..................................... 280/644; 220/19; 224/42.46 R; 280/658
[58] Field of Search ....................... 280/657, 641–644, 280/647, 649, 650, 42, 33.99 A, 658; 224/42.46 R, 42.45 R, 42.43, 32 R, 32 A, 36, 30 R, 30 A; 248/58, 95, 322, 339, 341; 220/19

[56] References Cited

U.S. PATENT DOCUMENTS

| 599,120 | 2/1898 | Coolidge | 224/30 A |
| 1,383,032 | 6/1921 | Scranton | 224/42.46 RX |
| 1,505,182 | 8/1924 | Wrixton | 224/42.46 R |
| 1,577,298 | 3/1926 | Roeller | 224/42.46 R |
| 2,558,372 | 6/1951 | Nidermayer, Jr. | 280/33.99 A |
| 3,532,356 | 10/1970 | Lillibridge | 280/644 X |
| 4,157,839 | 6/1979 | Lahti et al. | 280/647 |
| 4,186,859 | 2/1980 | Frankfort et al. | 224/46 R |

FOREIGN PATENT DOCUMENTS

| 1507446 | 11/1967 | France | 280/647 |
| 197750 | 8/1938 | Switzerland | 224/42.46 R |

Primary Examiner—Joseph F. Peters, Jr.
Assistant Examiner—Donald W. Underwood
Attorney, Agent, or Firm—Darby & Darby

[57] ABSTRACT

A basket for use with a stroller or carriage which is attached to the back of the stroller and is detachable therefrom, the basket attaching means permitting the stroller to be collapsed without affecting the shape or holding capacity of the basket.

9 Claims, 4 Drawing Figures

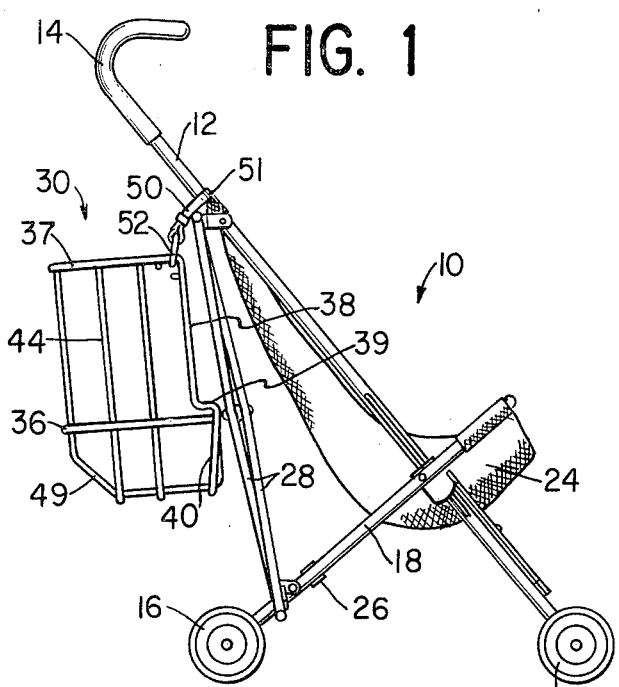
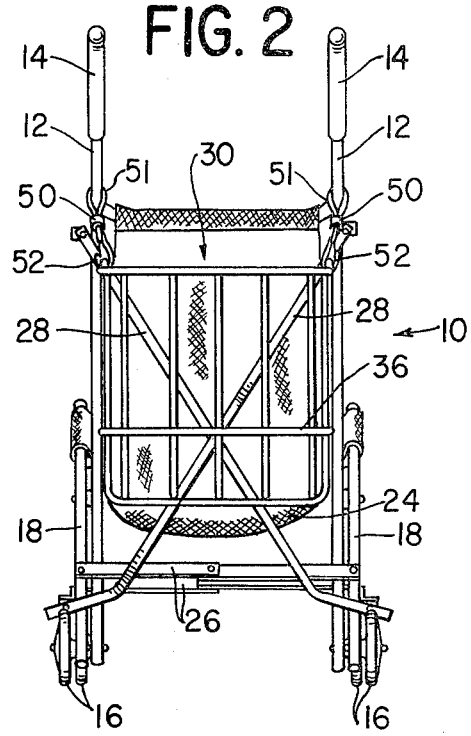
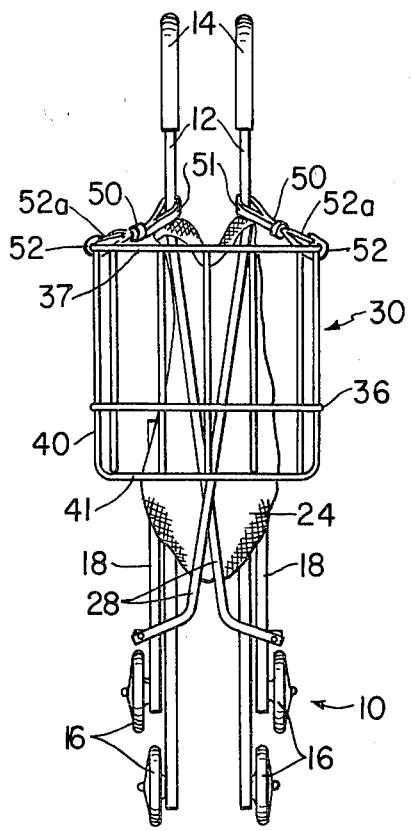
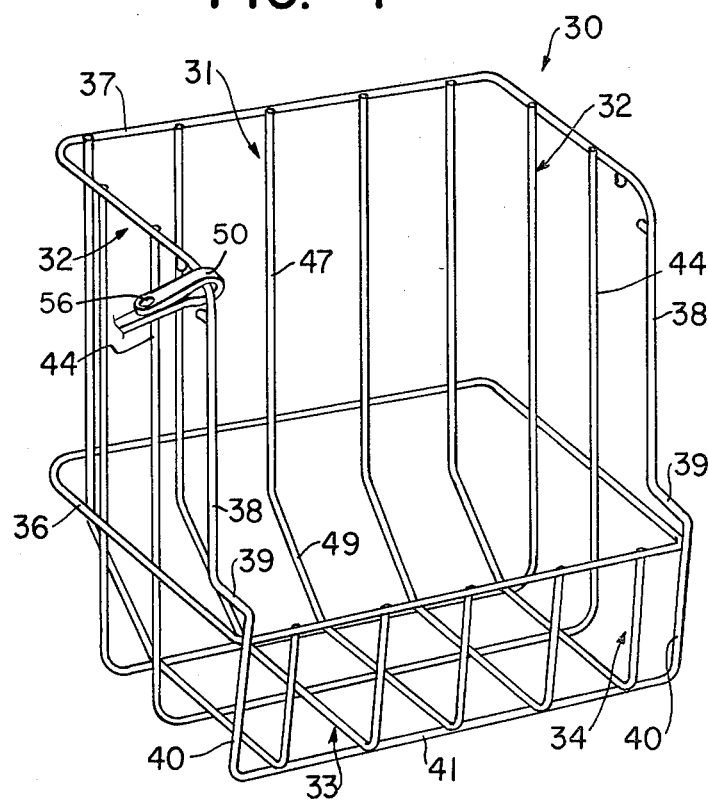

BASKET FOR STROLLER

A popular type of stroller for use in wheeling infants or juveniles is the so-called umbrella, or cane, type stroller. A stroller of this type generally includes two upright members having handles at one end and wheels at the other end. A pair of upwardly and angularly extending crosspieces are connected to the uprights and the wheels are attached to the lower end of these members. The seat, usually a piece of fabric, is attached between the uprights and the crosspieces. A scissors linkage is connected at the rear of the stroller between the uprights and the crosspieces as a folding mechanism. The linkage and folding mechanism permit the stroller to be collapsed into a relatively small package which can be easily carried, placed in a vehicle, or stored.

In the use of such a stroller, it is often desirable to have some sort of a holding implement, such as a basket, for the various items which are to be used for the baby or for use of the person pushing the stroller, such as to carry packages. The latter is useful during a shopping trip.

The present invention relates to a basket for use with a collapsible stroller of the foregoing type and also for other types of carriages and strollers. The basket is of wire or molded construction and includes closed back, side and bottom portions. The top part of the front of the basket is open. A pair of mounting straps fit around the stroller uprights and connect the basket so that it is freely hung from the uprights. Preferably, the mounting straps have releasable hooks, or other similar devices, so that the basket can be readily attached and detached from the stroller. The open front part of the basket permits the stroller to be collapsed in the usual manner without impairing the movement of the uprights and the collapsing mechanism.

It is, therefore, an object of the invention to provide a basket for use with a stroller or carriage.

An additional object is to provide a basket for a stroller which can be readily connected to the stroller and which permits the stroller to function in its normal manner.

A further object is to provide a basket for a stroller which is detachable from the stroller and which permits the stroller to be collapsed.

Other objects and advantages of the present invention will become more apparent upon reference to the following specification and annexed drawings in which:

FIG. 1 is a side elevational view of the basket in combination with the stroller;

FIG. 2 is a back view of the basket and stroller with the stroller being in its use position;

FIG. 3 is a back view showing the stroller collapsed; and

FIG. 4 is a perspective view of the basket.

Referring to the drawings, the invention is illustratively described for use with a collapsible stroller which is designated generally by reference numeral 10 and includes a pair of uprights 12 each of which has a handle 14 at its upper end and a wheel 16 rotatably mounted at its lower end. A crosspiece 18 is connected to each of the uprights 12 by a slide bracket 20. A wheel 16 is rotatably mounted to the lower end of each of the crosspieces 18. A seating member, such as a cloth piece 24 is connected between the two uprights 12 and the upper ends of the two crosspieces 18.

A folding mechanism is formed by pivotal horizontal cross-links 26, one of which extends between the uprights 12 at their lower ends and the other of which extends between the lower ends of the crosspieces 18, and also by the scissors links 28 which extend between the upper ends of uprights 12 and the lower ends of crosspieces 18 at the rear of the stroller.

As heretofore described, the stroller is of conventional construction and it is sufficient to say that the stroller can be in an uncollapsed position of use, shown in FIGS. 1 and 2, and can be collapsed, as shown in FIG. 3, by the actuation of the folding mechanism.

The basket 30 is illustratively shown as being of the open wire type made of either metal or plastic wire. It includes a back 31, sides 32, a bottom 33, and a front portion 34, which is of lesser height than the back. That is, the upper part of the front of the basket is open. The basket is formed by an intermediate, generally rectangular horizontal frame piece 36 and a main frame piece 37. The main frame piece 37 is horizontal and generally C-shaped at its upper end, the ends of the arm of the C extend vertically, downwardly at pieces 38, which terminate in an outwardly extending horizontal leg 39 below which there are short vertical pieces 40, which are connected by a horizontal connecting leg 41. The horizontal mid-frame piece 36 is connected to the main frame piece 37 on the short vertical pieces 40 just below the outwardly extending pieces 39. Where metal wire is used, the connection is accomplished by welding or soldering. When plastic wire is used, the connection is generally by an adhesive or by heat sealing.

The sides of the basket are formed by several inverted C-shaped pieces 44 which are connected at their upper ends to the upper C-shaped part of main frame piece 37 and also to the mid-frame piece 36. While two such C-shaped pieces 44 are shown, it should be understood that any number can be used, as needed.

The front and back of the basket are formed by generally L-shaped pieces 47 which are also connected to the upper part of the main frame piece 37, the back of the middle frame piece 36, the lower legs of the C-shaped side pieces 44, the bottom 41 of the main frame piece and to the front of the mid-frame piece 36. The backs of the C-shaped pieces 47 have a slanted portion 49 making the transition from the vertical to the horizontal legs of these pieces.

As seen, the front of the basket terminates at the mid-frame piece 36. Therefore, as shown, approximately the upper two thirds—three quarters of the front of the basket is open. The height of this open portion can be adjusted as desired.

To attach the basket 30 to the uprights 12 two straps 50 are provided. Each of the straps 50 has a loop 51 at one end which fits over the handle of the upright. The ends of the loops 51 come to rest against the upper part of the seat piece 24 and the connection attaching the respective upper ends of the scissors linkage 28 to the uprights 12. This fixes the upper position of the basket. If desired, the loop can have a buckle. However, this is not absolutely necessary and a simple riveted or stitched strap can be used as well as a strap with a snap type fastener.

At the other end of strap 50 is a spring clip, or clamp, 52. The spring member 52a of the clip is pressed inwardly so that the clip can be fastened around the upper part of the basket main frame 37, as shown in FIG. 1. These are two points of attachment for the basket to the stroller. Thus, the basket is attached to the stroller by slipping the loops 51 over the handles and connecting the spring clips to the basket. The basket is removed by actuating the spring clips or by unsnapping strap 50 by a snap fastener 56 as shown in FIG. 4.

The use of the basket is explained by referring to FIGS. 1-3. When the stroller is in its uncollapsed condition for use, as shown in FIGS. 1 and 2, the basket is suspended from the uprights 12 by the straps 50. As the basket tilts forward, the front 33 engages the scissors crosspieces 28 to prevent further forward motion. In addition, the scissors crosspieces 28 provide a partial finish for the upper open front of the basket. The open upper front of the basket provides better access to the basket to either insert or remove packages. For example, it is possible to move the basket rearwardly by pulling on it with the basket pivoting about the straps 50, place the packages in the basket and then permit the basket to move forwardly. To remove packages, the basket can again be moved rearwardly to provide freer access.

When collapsing the stroller, as shown in FIG. 3, the straps 50 move outwardly as the bottom front portion 33 of the basket engages the scissor crosspieces 28. When the stroller is collapsed, the uprights 12 tend to achieve a more vertical position approaching the scissors pieces 28. The open upper front of the basket permits the collapsing action to be accomplished without interference with either the uprights 12 or the scissors cross pieces 28. In this manner the stroller can be collapsed in its normal manner with the connection between the basket and the stroller still being maintained.

To remove the basket it is only necessary to unhook the clips 52 or unsnap or remove the strap. In this manner, the basket can be used separately or as a carrier for the packages which are already stored therein or else the basket can be totally removed and stored.

While a wire frame arrangement has been shown for the basket, it should be understood that other types of arrangements can also be utilized. For example, the two frame pieces 37 and 36 can be provided and suspended therefrom can be a mesh of nylon or other similar material. The basket also can be molded, for example, of a plastic material.

What is claimed is:

1. The combination comprising a collapsible stroller of the type having two upright members each with a handle thereon and means including a supporting linkage extending between the two upright members for collapsing the stroller from a use position where the upright members are spaced apart to a collapsed position where the upright members are relatively close together, said basket including a back, sides, a flat bottom for accepting parcels to be placed thereon and a front all of a non-foldable material which are joined together, said back and said sides being of substantially the same height and said front being of substantially from about only one-quarter to about only one-third the height of the back and the sides and engaging the supporting linkage while leaving the major portion of the basket front open, a respective flexible means for attaching the basket in a freely hanging manner only to a respective upright member and only at one point thereon, there being only two of said attaching means which serve as the only means for attaching the basket and each attaching means including means for a pivotal connection to the upper end of a respective side of the basket and means for a slidable connection to the respective upright member with the open front of the basket facing the upright members to trap articles placed in the basket against the stroller, the length of each said attaching means being such as to permit the stroller to be collapsed without removing the non-foldable basket from the stroller.

2. The combination as in claim 1 wherein each said attaching means comprise a strap having a loop portion for fitting around the respective upright member to form the slideable connection.

3. The combination as in claim 2 wherein the basket connection means of each said strap comprises a spring clip to permit the respective strap to be attached to and detached from the basket and to form the pivotal connection.

4. The combination as in claim 2 wherein the basket connection means of each strap comprises a snap member.

5. A basket as in claim 1 wherein said back, sides, bottom and front are formed of wires which are connected together.

6. The combination as in claim 5 wherein each said attaching means comprise a strap for each said upright, the upright connection means of each said strap having a loop portion for fitting around the respective upright member to form the pivotal connection.

7. The combination as in claim 6 wherein the basket connection means of each said strap comprises a spring clip to permit the strap to be attached to and detached from the basket.

8. The combination as in claim 5 wherein the wires forming the bottom comprise a substantially flat section adjacent the front of the basket and upwardly angled transition members extending from a point intermediate the front and back to the back.

9. A basket as in claim 1 wherein the back and side walls are of the same height and are of substantially rigid material.

* * * * *